March 18, 1969 E. E. GOEHLER 3,433,018
SELF-COMPENSATING SERVO SYSTEM CONTROL UNIT
Filed Oct. 23, 1965

ELMER E. GOEHLER
INVENTOR

BY
BUCKHORN, BLORE, KLARQUIST & SPARKMAN
ATTORNEYS

ELMER E. GOEHLER
INVENTOR

BY
BUCKHORN, BLORE, KLARQUIST & SPARKMAN
ATTORNEYS

ELMER E. GOEHLER
INVENTOR

BY
BUCKHORN, BLORE, KLARQUIST & SPARKMAN
ATTORNEYS

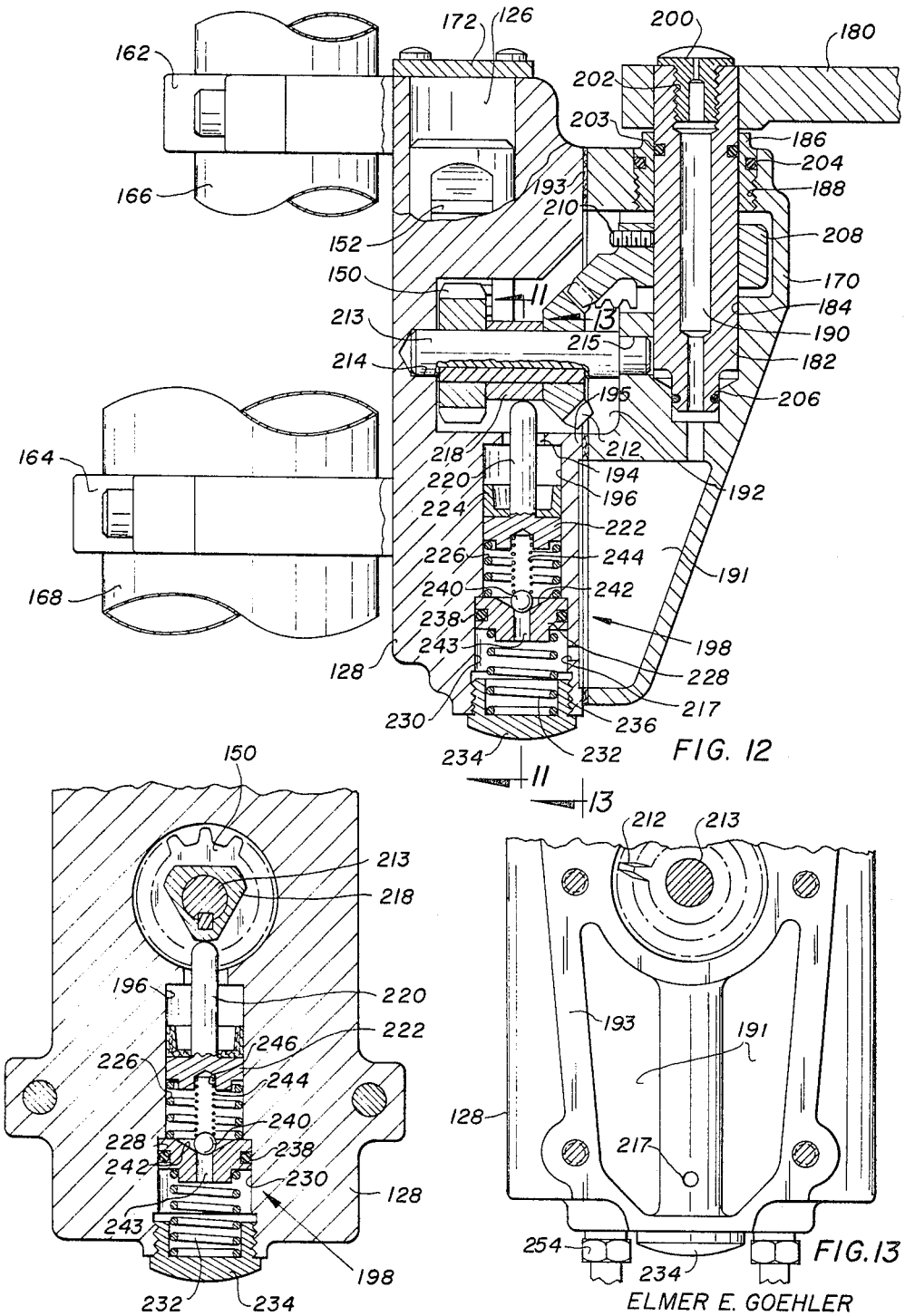

United States Patent Office 3,433,018
Patented Mar. 18, 1969

3,433,018
SELF-COMPENSATING SERVO SYSTEM
CONTROL UNIT
Elmer E. Goehler, Portland, Oreg., assignor to
Central Brass & Aluminum Foundry, Portland, Oreg., a partnership
Filed Oct. 23, 1965, Ser. No. 502,949
U.S. Cl. 60—54.5                9 Claims
Int. Cl. F15b 7/00, 15/14

ABSTRACT OF THE DISCLOSURE

Coaxial shafts of a remote control drive pairs of pistons to control a rudder and a gearshift, and one of the shafts drives a replenisher piston to keep the system filled with liquid. In another remote control, a master unit has drive pistons of different diameters to drive a double action cylinder device to compensate for the different effective areas of the piston of the cylinder device.

This invention relates to improved remote controls, and more particularly to self-compensating servo systems.

Servo systems are used extensively as remote controls in many applications such as, for example, for steering boats and for shifting gears in boats and other vehicles. Such servo systems utilize hydraulic lines to drive the device to be controlled, and often utilize a reversible hydraulic device for driving the device to be controlled. Such hydraulic devices are sealed to prevent leakage of the hydraulic liquid, but such sealing in most commonly used hydraulic devices does permit some leakage of the hydraulic liquid, and unless the liquid so leaked is replaced the control becomes spongy or soft. Compensating devices such as, for example, accumulators, have been placed in the hydraulic lines to replenish liquid lost, but such accumulators have a limited volme and when this volume is exhausted are unable to replenish lost liquid. It would be desirable to have a self-compensating servo system which is independent of any outside source of power and which automatically replenishes itself from power derived from use of the servo system.

An object of the invention is to provide new and improved remote control system.

Another object of the invention is to provide self-compensating servo systems.

Another object of the invention is to provide a master control unit for a servo system which automatically replenishes lost hydraulic liquid whenever the control unit is actuated.

Yet another object of the invention is to provide a master control unit having a pair of oppositely driven hydraulic pistons provided with check valve means to permit flow of hydraulic liquid from a reservoir therepast together with manually operable actuating means for driving the pistons and a replenisher which is cocked or loaded by operation of the manually operable means to supply hydraulic liquid to the reservoir.

A still further object of the invention is to provide a self-contained master control unit for a servo system which includes a replenisher driven by a manually operated device of the unit.

The invention provides a remote control hydraulic system which is subject to leakage of liquid therefrom which includes driving means for supplying power to the system and a replenisher driven by the driving means when the latter is operated to urge additional hydraulic liquid into the system to replenish losses of the liquid from the system. In a remote control device forming a specific embodiment of the invention, a master control unit is provided with a first pair of pistons positioned between a reservoir and a pair of hydraulic lines leading to a rudder device for steering a boat, the pistons are driveable in opposite directions by a steering shaft having a pinion meshing with racks on the pistons, and the steering shaft is provided with a cam for moving a replenisher piston against the action of a spring to expand the reservoir. The replenisher piston is provided with a check valve means such as, for example, a pump leather, to permit hydraulic liquid to flow therepast into the reservoir when the piston is moved against the spring from a cylinder portion which is supplied with hydraulic liquid through a second check valve from a large source of supply of the hydraulic liquid. A second pair of pistons of the unit are driven in opposite directions by a sleeve coaxial with the shaft and operable manually by a lever on the sleeve, the sleeve having a pinion on one end thereof meshing with racks of the second pair of pistons. The second pair of pistons also are provided with check valve means to permit the flow of hydraulic liquid from the reservoir therepast toward the outlets thereof, and hydraulic lines connect the cylinder portions in which the second pair of pistons are mounted to a second device to be controlled such as, for example, a gearshift.

A complete understanding of the invention may be obtained from the following detailed description of remote controls forming specific embodiments thereof, when read in conjunction with the appended drawings, in which:

FIG. 11 is a generally vertical, sectional view taken substantially along line 11—11 of FIG. 12;

FIG. 12 is a generally vertical, sectional view taken substantially along line 12—12 of FIG. 10; and FIG. 13 is a vertical, sectional view taken substantially along line 13—13 of FIG. 12.

Figure 1:
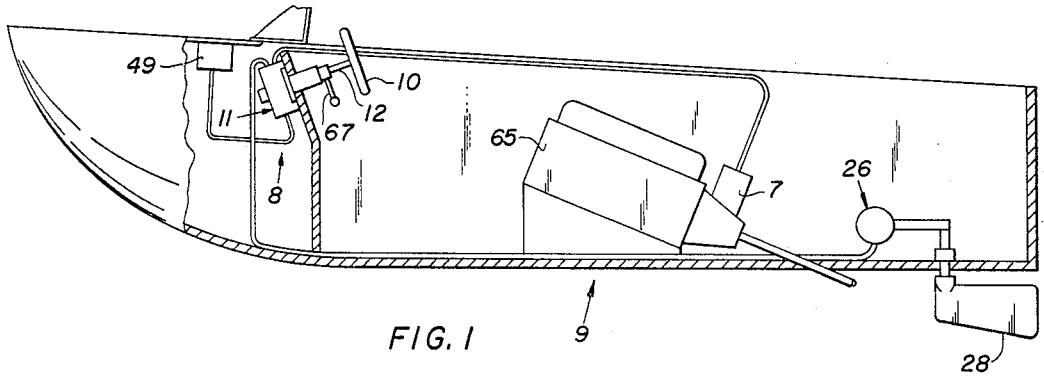
FIG. 1 is a schematic, partially sectional view of a boat with a remote control forming one embodiment of the invention.
Figure 2:
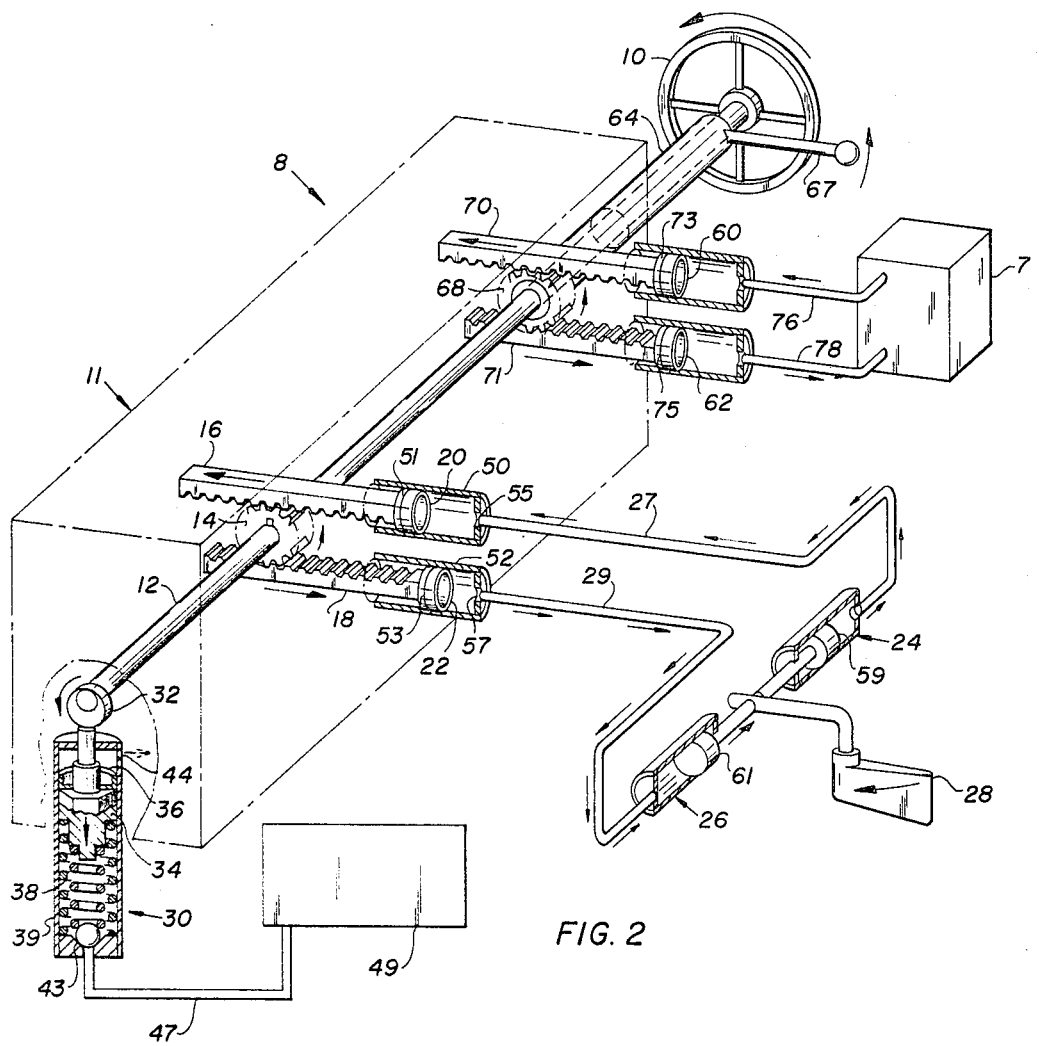
FIG. 2 is a schematic view of the remote control of FIG. 1.
Figure 4:
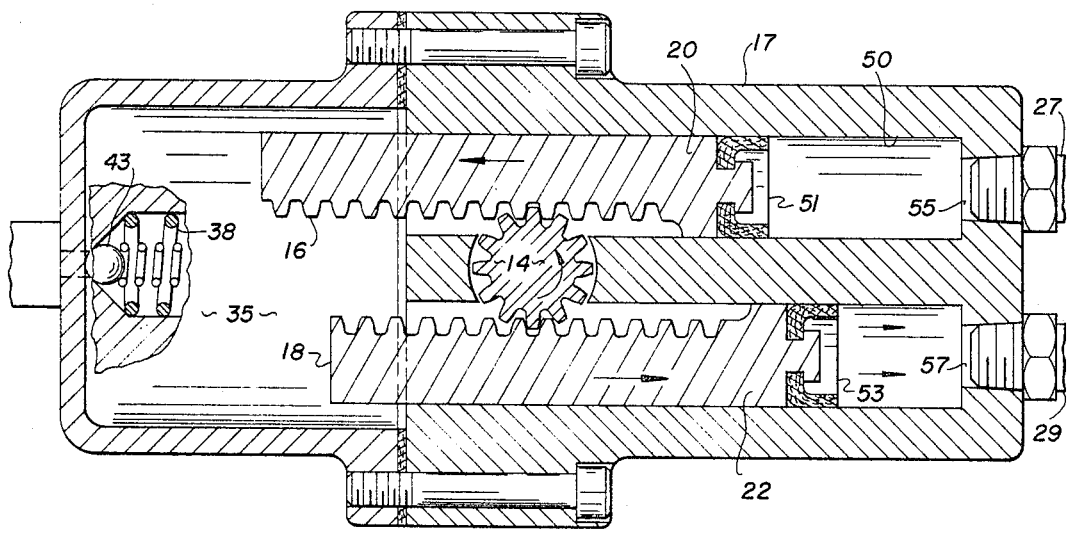
FIG. 4 is a generally vertical, sectional view taken substantially along line 4—4 of FIG. 3.

Referring now in detail to the drawings, there is shown in FIGS. 1 and 2 a remote control 8 for a boat 9 which controls steering of the boat and also shifting of gears of a transmission 7 of the boat. As illustrated in FIG. 2, the remote control includes a steering wheel 10 of a master unit 11 and adapted to rotate a shaft 12 having a pinion 14 keyed thereto to drive a rack 16 in one direction and to drive a rack 18 in the direction opposite to the rack 16. The racks 16 and 18 are slidable in a split housing or casing 17 (FIG. 4). Movement of the racks drives pistons 20 and 22 of equal diameters and secured to the racks 16 and 18, respectively, in opposite directions to drive, through hydraulic liquid in hydraulic lines 27 and 29, slave units or cylinder devices 24 and 26 (FIG. 2) in opposite directions. The slave units 24 and 26 are of equal diameters, and, being driven in opposite directions, move a rudder 28 in the direction desired.

In order to keep out any backlash between the pinion 14 and racks 16 and 18 and to keep any play out of the slave units and rudder 28 from leakage of fluid from the cylinder devices 24 and 26, a replenisher 30 is provided which is driven by a cam 32 of the shaft 12 whenever the steering wheel 10 is turned from neutral. The replenisher comprises a piston 34 having a one-way pump leather or check valve 36, with a compression spring 38 urging the piston 34 toward the reservoir end of a cylinder 39, and hydraulic liquid trapped behind the piston 34 moves past the pump leather 36 into the end of the cylinder 39 adjacent to and communicating with a reservoir portion 35. A check valve 43 at the lower end of the cylinder 39 prevents flow of the hydraulic liquid out of the cylinder 39 to a supply line 47 when the piston 34 is moved downwardly in the cylinder 39, but permits flow of hydraulic liquid from the supply line 47 into the cylinder 39 when the piston 34 is moved upwardly in the cylinder 39. The supply line 47 leads to a container 49 having a large supply of hydraulic liquid under a low head of pressure just sufficient to cause the hydraulic liquid to flow freely into the cylinder 39 when the piston 34 is moved upwardly in the cylinder 39, the container 49 preferably being mounted above the replenisher 30 to provide by gravity the low head of pressure.

When the steering wheel 10 is turned from neutral, the cam 32 forces the piston 34 and pump leather 36 downwardly against the action of the spring 38, and the pump leather 36 permits the hydraulic liquid in the lower end of the cylinder 39 to move past the pump leather 36 into the upper end of the cylinder 39. Then, when the steering wheel 10 is moved back to neutral position, the spring 38 urges the piston 34 and pump leather 36 in an upward direction, as viewed in FIG. 2, and the pump leather 36 prevents the hydraulic liquid from escaping back downwardly therepast. This tends to force the hydraulic liquid out of the outlet 44 in the upper end of the cylinder 39 and into the reservoir portion 35. The force of the spring 38 preferably is sufficient to maintain the hydraulic liquid in the reservoir portion 35 under a pressure of around five pounds per square inch. The reservoir encloses the racks 16 and 18 and the outlet 44 of the replenisher 30, and the hydraulic liquid is maintained under the moderate pressure in the reservoir 35 by the replenisher 30, as described above.

The pistons 20 and 22 also have pump leathers 51 and 53 which serve as seals and as check valves. The pump leathers permit the hydraulic liquid to escape therepast to the hydraulic lines 27 and 29, to keep the lines 27 and 29 and the head end portions of the cylinder devices 24 and 26 filled with hydraulic liquid. The pump leathers prevent any appreciable escape therepast toward the reservoir. Consequently, the head end portions of cylinders 50 and 52, between which the pistons 20 and 22, respectively, slide, which are adjacent outlets 55 and 57 of the cylinders, are kept full of hydraulic liquid, and the moderate pressure on the hydraulic liquid maintains pistons 59 and 61 of cylinder devices 24 and 26 pressed toward each other as far as possible so that no play is possible between the pistons 59 and 61 and the rudder 28. Since the pistons 20 and 22 work in opposite directions, and since the hydraulic lines 27 and 29 extending from the outlets 55 and 57 of the cylinders 50 and 52 are maintained full of hydraulic liquid always, there is no backlash whatsoever between the racks 16 and 18 and the pinion 14. Also, any slight leakage of hydraulic liquid through an O-ring seal 63 of the shaft 12 is replaced by the replenisher 30. Conceivably, the outlet 44 of the replenisher 30 could be connected to the lines 27 and 29 through individual check valves (not shown) permitting flow only from the replisher individually to each of these lines, as an alternate construction.

Figure 3:
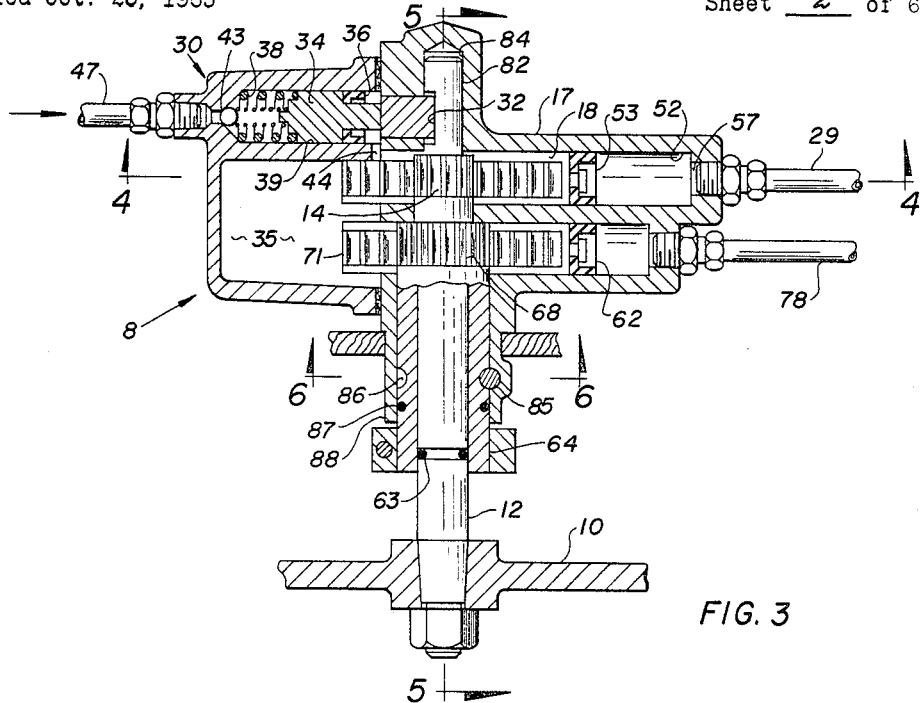
FIG. 3 is a generally vertical, sectional view of a master unit of the remote control of FIG. 1.
Figure 5:
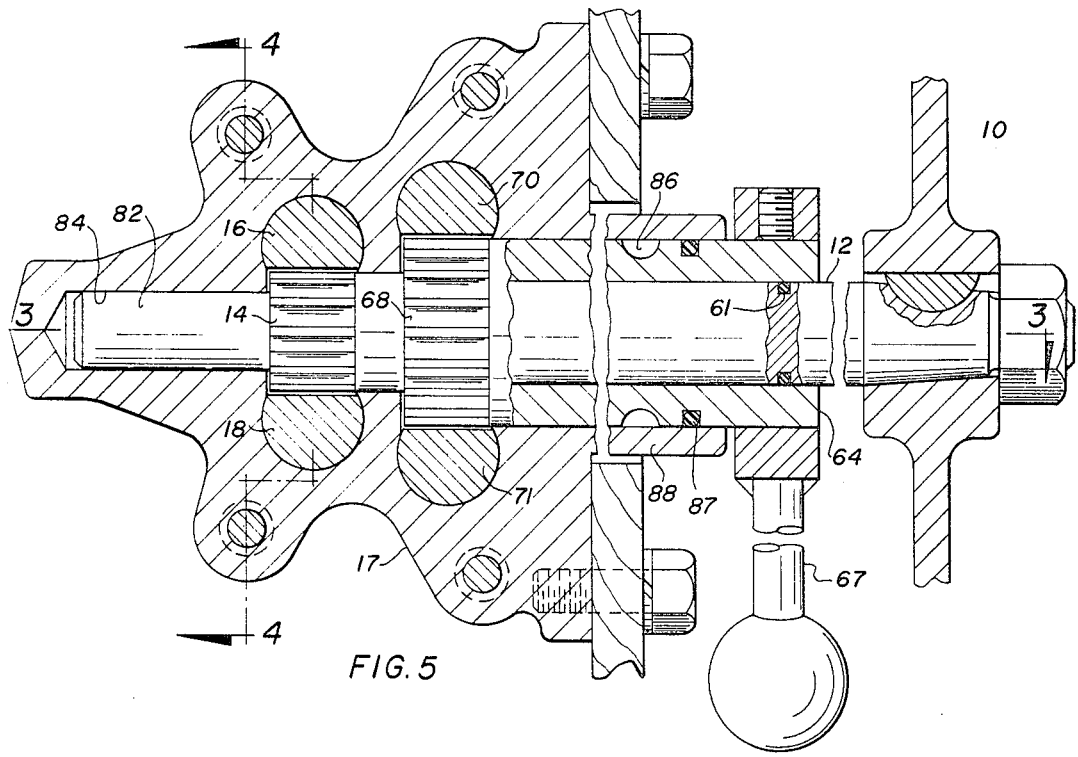
FIG. 5 is a generally horizontal, sectional view taken substantially along line 5—5 of FIG. 3.
Figure 6:
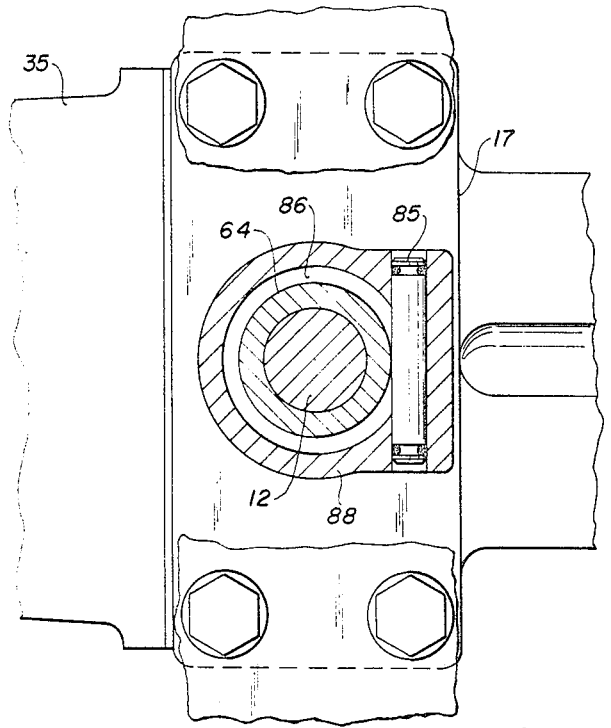
FIG. 6 is a generally vertical, sectional view taken substantially along line 6—6 of FIG. 3.

The master unit 11 also includes a pair of pistons 60 and 62 (FIGS. 2, 3 and 5) adapted to control a reversible slave unit portion of the gearshift or transmission 7 drivable by engine 65 of the boat through an external tubular shaft or sleeve 64 mounted rotatably on the steering shaft 12 and operable by manually operable lever 67. The shaft 64 has a pinion 68 thereon adapted to drive a pair of racks 70 and 71 in opposite directions to drive the pistons 60 and 62 which have pump leathers 73 and 75 thereon to control the gearshift by liquid transmitted through a pair of hydraulic lines 76 and 78 to the slave unit portion of the gearshift. The shaft 12 has an end portion 82 journaled in a bore 84 in the casing 17, and whenever the shaft 12 is moved from neutral it moves the piston 34 downwardly, as viewed in FIG. 2, in the cylinder 39. Pressure relief valves (not shown) may be connected to the lines 27, 29, 76 and 78 to maintain the pressures of the hydraulic liquids in the lines high, and prevent extremely high pressures therein. A pin 85 fitting in a groove 86 holds the sleeve 64 against thrust, and an O-ring seal 87 is provided between the sleeve 64 and a tubular portion 88 of the casing 17.

The above-described remote control 8 has a self-contained master unit 11 which, whenever the steering wheel 10 is turned from neutral and then returned to neutral, serves to actuate the replenished 30 to supply more hydraulic liquid to the reservoir portion 35 if additional liquid is needed in the system. Thus, even after the steering wheel 10 has not been used for a long period of time and hydraulic liquid has leaked from the cylinder devices 24 and 26 or the slave unit portion of the gearshift 7, the losses are immediately replaced merely by turning the steering wheel 10 back and forth from neutral, which, of course, is automatic replenishing, and without any other power other than that utilized to exert control of the remote control. If desired, a second replenisher similar to the replenisher 30 could be provided for actuation by the actuating sleeve 64. However, in actual practice, since the steering wheel 10 is more often turned and the reservoir portion 35 is common to all the pistons 20, 22, 60 and 62, the single replenisher 30 operates to efficiently keep the hydraulic liquid in the reservoir portion 35 under a low pressure to replenish both the remote control system of the gearshift and the remote control system of the rudder.

*Embodiment of FIGS. 7 to 12*

A remote control 108 (FIG. 7) forming an alternate embodiment of the invention includes a manually operable master unit 112 for driving a slave unit 114 to operate a control, such as, for example, a transmission (not shown) of a boat between neutral, forward and reverse conditions. The slave unit 114 is a conventional hydraulic cylinder device including a cylinder 116 of uniform diameter throughout its length, a piston 118 and a piston rod 120 of a predetermined diameter slidable through a bore 122 in one end of the cylinder. The bore 122 has suitable conventional sealing means therein to keep leakage at a minimum. A hydraulic line 124 connects the head end portion of the cylinder 116 to the head end portion of cylinder portion or bore 126 formed in central housing section 128 of the master unit. Hydraulic line 130 connects the other end of the cylinder 116 to the head end portion of cylinder portion or bore 132 in the housing section 128.

Figures 7, 8:
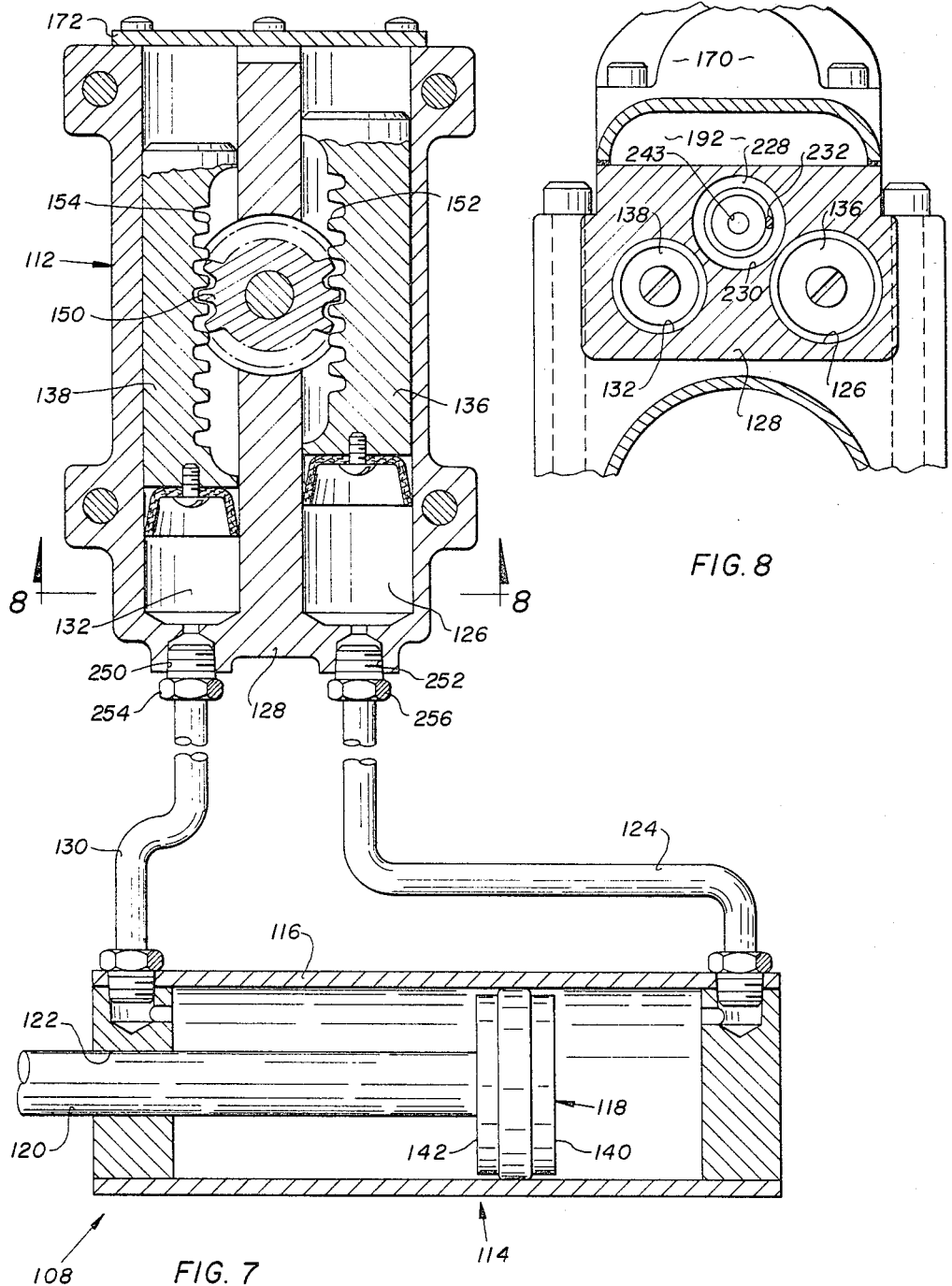
FIG. 7 is a generally vertical, sectional view of a remote control forming an alternate embodiment of the invention.
FIG. 8 is a generally horizontal, sectional view taken substantially along line 8—8 of FIG. 7.
Figure 10:
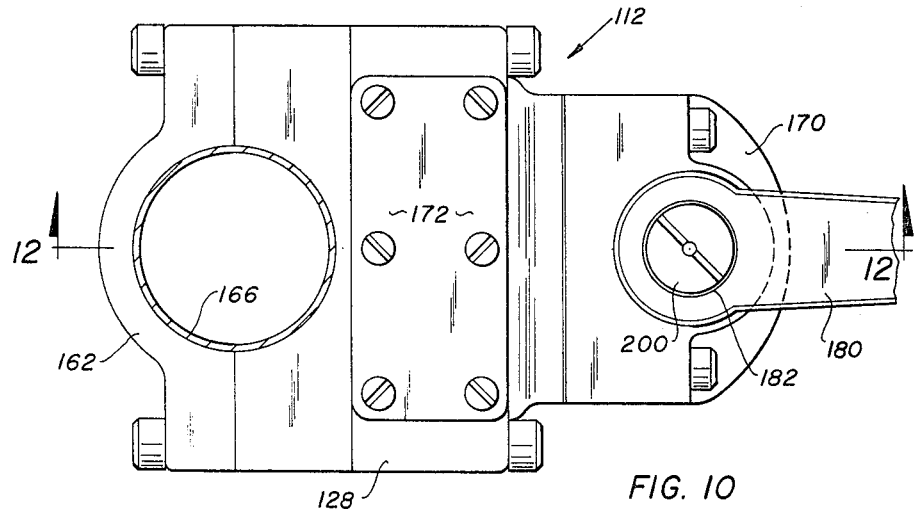
FIG. 10 is a top plan view of the remote control of FIG. 7.
Figure 9:
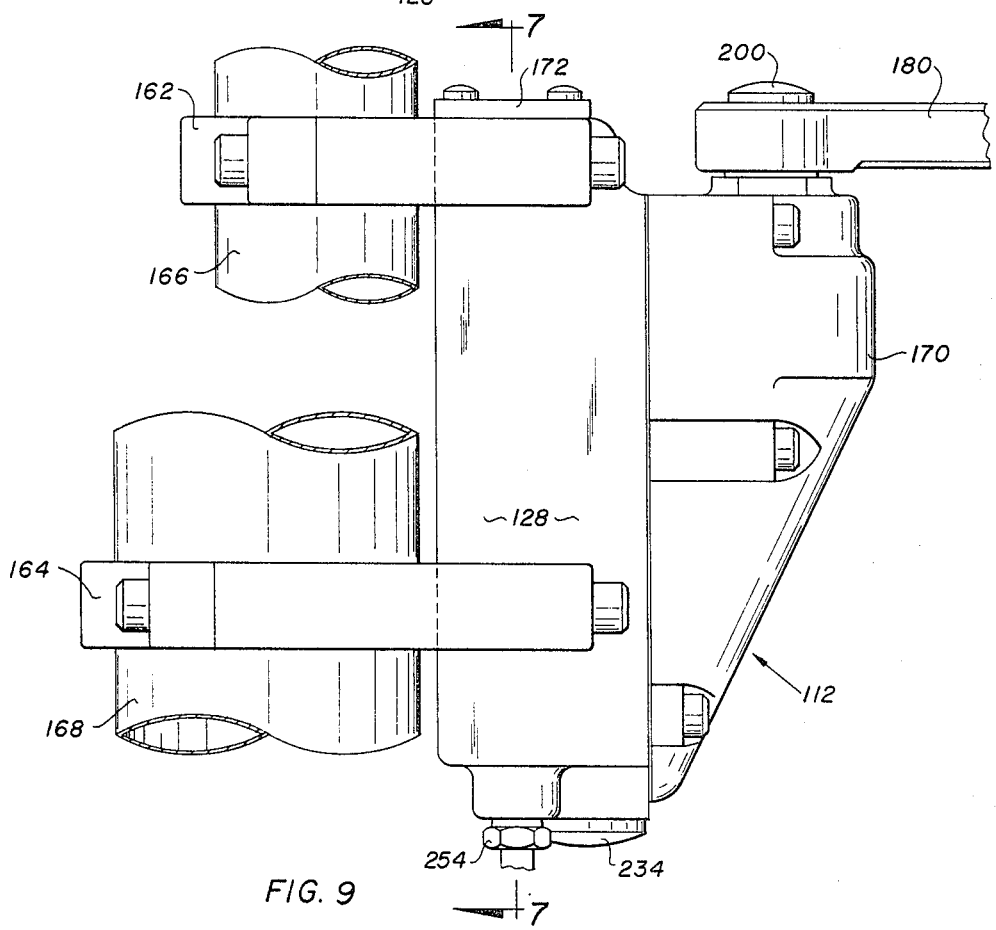
FIG. 9 is a fragmentary side elevation view of the remote control of FIG. 7.

As illustrated best in FIGS. 7 and 8, the bore 126 and a piston 136 fitting therein are larger in cross-sectional area than the bore 132 and a piston 138 fitting therein in the same proportion that the effective area of head end 140 of the piston 118 (FIG. 7) is greater than the effective area of rod end 142 of the piston 118. Hence, the ratio of displacement in the bore 126 for a given length of movement of the piston 136 relative to the displacement in the bore 132 for the same length of movement of the piston 138 is equal to the ratio of the area of the head end 140 of the piston 118 to the area of the rod end 142, which is equal to the cross-sectional area of the cylinder 116 less the cross sectional area of the piston rod 120. Hence, when the pistons 136 and 138 are moved equal distances in opposite directions by a driving pinion 150 meshing with racks 152 and 154 and the piston 118 is moved thereby, the volume between the head end 140 and the piston 136 does not change and the volume between the rod end 142 and the piston 138 does not change. Thus, even though there are different displacements between the head end of the cylinder 116 and the rod end thereof when the piston 118 is moved along the cylinder and the pistons 136 and 138 are always moved equal but opposite directions by the pinion 150, there is no tendency to lock up or jam the device 114.

The housing of the master unit 112 includes, in addition to the central housing section 128, split clamps 162 and 164 (FIGS. 9 and 10) adapted to mount the master unit on post members 166 and 168. A cover section 170 and a cap 172 also are provided. An actuating handle or lever 180 (FIG. 12) is keyed to hollow shaft 182 journaled in a bore 184 and a bushing 186 threaded into counterbore 188 in the cover section 170. The bore 184 and lower end of passage 190 through the shaft 182 open to a low pressure storage chamber 191 of the housing, which is sealed off from a pressure tight reservoir portion 192 by a gasket 193 and wall 195. The reservoir portion 192 is in free communication with the upper ends of the bores 126 and 132, as viewed in FIG. 7, and with a passage 194 at the upper end of cylinder bore 196 which is formed in the housing section 128 and forms a part of an expansible replenisher 198. A plug 200 threaded into tapped portion 202 of the bore 190 may be removed for initially filling the storage chamber 191 of the master unit with hydraulic liquid. O-ring seals 203, 204 and 206 (FIG. 12) are provided to minimize leakage of the liquid therepast. A beveled gear segment 208 keyed by setscrew 210 to the shaft 182 meshes with and drives beveled gear 212 which is keyed to a shaft 213 to which the pinion 150 is keyed. The shaft 213 is journaled in bearing portion 214 of the housing section 128 and bearing portion 215 in the cover portion 170. A bore 217 (FIG. 12) connects the storage chamber 191 having a low pressure head of hydraulic liquid to a counterbore 230.

A cam 218 (FIG. 12) keyed to the shaft 213 pushes follower push rod 220 downwardly as viewed in FIGS. 11 and 12 whenever the handle 180 is turned to either side of its centered, neutral position. The push rod is rigidly mounted on a replenisher piston 222 having pump leather 224 mounted thereon. The piston 222 fits slidably in the bore 196 and is urged upwardly therein by spring 226 seated between the piston 222 and a piston-like, check valve member 228 slidable in counterbore 230 in the housing section 128 by spring 232. The spring 232 is stronger than the spring 226, and is seated between the member 228 and a closure plug 234 threaded into tapped portion 236 of the counterbore 230. An O-ring 238 seals the member 228 in the counterbore 230. A ball 240 is urged toward valve seat 242 in the check valve member 228 and closing passage 243 by a spring 244 seated in bore 246 in boss portion 248 of the piston 222. Tapped bores 250 and 252 are adapted to receive fittings 254 and 256 connecting the lines 124 and 130 to the cylinder bores 126 and 132.

In the operation of the remote control of FIGS. 7 to 12, when the lever 180 is turned from neutral, the pinion 150 and cam 218 are turned. The pinion 150 moves the pistons 136 and 138 in opposite directions and equal distances to move the piston 118 accordingly in the desired direction and for the desired distance. Since the ratio of the areas or displacements of the pistons 136 and 138 matches that of the faces 140 and 142, the total volume of the two closed systems from the pistons 136 and 138 to the faces 140 and 142 remains constant. However, movement of one of the pistons 136 and 138, which differ in displacement, out of the reservoir portion 192 and movement of the other of these pistons into the reservoir portion increases or decreases, depending on which way the lever 180 is turned, the volume of the reservoir portion or cavity itself. Since the reservoir portion is filled with the hydraulic liquid which is, of course, incompressible, whenever the volume thereof is decreased, the replenisher piston 222 and the valve member 228 are moved downwardly, as viewed in FIG. 12, by increase in pressure of the liquid in the reservoir portion to compensate for the decrease in volume of the reservoir portion 192. That is, the volume of the space between the upper end of the piston 222 and the upper end of the bore 196 is increased by the identical amount that the volume of the reservoir portion 192 per se is decreased. Assuming the push piston 222 to be in its uppermost position with the push rod 220 engaging the cam 218, whenever the handle or lever 180 is turned from its neutral position in a direction increasing the volume of the reservoir portion 192, the cam 218 is turned and moves the push rod 220 and the piston 222 downwardly in the bore 196 toward the check valve member 228, the hydraulic liquid flowing around the valve leather 224. Then, on return of the handle to its neutral position, the volume of the reservoir portion is decreased and the check valve member 228 is moved downwardly less than one-half its permitted movement, the piston 222 moving therewith and remaining in its cocked or loaded position. The piston 222 then maintains the liquid in the reservoir portion under a replenishing pressure just sufficiently high to replace any liquid lost from the system by leakage. On subsequent movement of the handle from its neutral position, both the piston 222 and the valve member 228 move farther downwardly when the reservoir portion is decreased in volume and move upwardly when the reservoir portion is increased in volume. Whenever liquid flows from the reservoir portion 192 to replace leakage, the piston 222 is moved upwardly relative to the check valve member 228 and draws the liquid into the space therebetween through the passage 243, the decrease in pressure in the space between the piston 222 and the valve member 228 causing the liquid in the passage 243 to raise the ball 240 from the valve seat 242.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In combination,
a hydraulic system subject to leakage of a hydraulic liquid therein and including master cylinder means,
manually operable means for actuating the master cylinder means,
a supply of hydraulic liquid,
a replenishing reservoir containing hydraulic liquid,
expansible replenishing means connected to the reservoir and to the supply and expansible operation of the manually operable means,
and having check valve means permitting flow of hydraulic liquid from the supply of hydraulic liquid to the reservoir when the expansible replenishing means is expanded and preventing flow of the liquid from the reservoir toward the supply,
and means urging the expansible replenishing means toward its contracted condition to place the hydraulic liquid in the reservoir under pressure,
the replenishing means serving to supply liquid to the reservoir from the supply of hydraulic liquid when actuated by operation of the manually operable means in one movement.

2. In combination,
a cylinder having an outlet end and a second end,
reservoir means connected to the second end of the cylinder, a piston slidable in the cylinder and having check valve means permitting flow of hydraulic liquid therepast toward the outlet end of the cylinder and preventing flow of liquid therepast away from the outlet end of the cylinder, supply means holding a supply of the hydraulic liquid, a replenishing cylinder having an outlet at one end connected to the reservoir means, a replenishing piston slidable in the replenishing cylinder and including check valve means permitting flow of hydraulic liquid therepast toward the outlet of the replenishing cylinder and preventing flow of the liquid therepast in the opposite direction, check valve means connecting the other end of the replenishing cylinder to the supply means for permitting flow of the liquid only from the supply means to the replenishing cylinder, spring means urging the replenishing piston toward the outlet of the replenishing cylinder, manually operable means for moving the piston and for driving the replenishing pump means, and means operable by the manually operable means for moving the replenishing piston against the action of the spring means.

3. In a master control unit, a casing having a pair of cylinder portions and having an outlet passage at one end of each cylinder portion adapted to be connected to a reversible hydraulic device to be driven, the casing also being provided with a replenishing cylinder having an outlet at one end thereof opening into the casing, the other ends of the cylinder portions communicating with the interior of the casing, a hydraulic liquid in the casing, a pair of pistons slidable in the cylinder portions and each being provided with means permitting flow of the liquid therepast toward said one end of the cylinder portion and preventing flow of the liquid past the piston in the opposite direction, means coupling the pistons together to cause the pistons always to move in opposite directions relative to their respective cylinder portions, drive means for driving the pistons, a replenishing piston in the replenishing cylinder and movable away from the outlet of the replenishing cylinder by the drive means when the latter is actuated, the replenishing piston having check valve means permitting flow therepast only toward the outlet, spring means urging the replenishing piston toward the outlet, supply means for supplying hydraulic liquid, and check valve means connecting the supply means to the end of the replenishing cylinder remote from the outlet and permitting flow of the liquid only from the supply means to the replenishing cylinder.

4. In a master control unit, a casing having a pair of cylinder portions and having an outlet passage at one end of each cylinder adapted to be connected to a reversible hydraulic device to be driven, the other ends of the cylinder portions communicating with the interior of the casing, a hydraulic liquid in the casing, a pair of pistons slidable in the cylinder portions and each being provided with means permitting flow of the liquid therepast toward said one end of the cylinder portion and preventing flow of the liquid past the piston in the opposite direction, means coupling the pistons together to cause the pistons always to move in opposite directions relative to their respective cylinder portions, drive means for driving the pistons, and replenishing means carried by and opening into the casing and drivable by the drive means when the latter is actuated to urge hydraulic liquid into the casing.

5. In a servo system, a casing having a pair of parallel cylinders therein, a pair of pistons slidable in the cylinders and having opposed racks extending from the pistons, a pinion meshing with the racks, drive means for reversibly driving the pinion, a reversible driven member, reversible displacement means for driving the driven members, a pair of hydraulic lines conecting one end of each of the cylinders to opposite sides of the displacement means to form a pair of closed hydraulic systems therewith, reservoir means connecting the other ends of the cylinders together, a hydraulic liquid in the hydraulic lines and the reservoir means, means maintaining the liquid in the reservoir under a predetermined pressure, and means connecting the reservoir means to the cylinders for unidirectional flow from the reservoir means to the cylinders.

6. In a master control unit for a hydraulic system subject to leakage of hydraulic liquid therefrom, a casing having a pair of parallel cylinder portions having outlets at the same end of each cylinder portion and a reservoir portion at the opposite ends of the cylinder portions, a pair of pistons slidable in the cylinder portions having unidirectional flow-permitting means permitting flow of hydraulic liquid therepast only from the reservoir portion toward the outlets of the cylinder portions, a pair of rack portions secured to the pistons in opposed positions extending toward the reservoir portion, an actuating shaft journaled in the casing, a pinion rotatable by the actuating shaft and meshing with both of the rack portions for moving the rack portions in opposite directions, a replenisher carried by the casing and opening into the casing and operable when actuated to tend to supply hydraulic liquid under a low pressure into the reservoir, and means driven by the shaft for actuating the replenisher.

7. In a master control unit of a hydraulic system subject to leakage of hydraulic liquid therefrom, a casing having a first pair of parallel cylinder portions having outlets at the same end of each cylinder portion and a reservoir portion at the opposite ends of the cylinder portions, the casing also being provided with a second pair of parallel cylinder portions having outlets at the same end of each and connected to the reservoir portion at the other ends thereof, a first pair of pistons slidable in the first pair of cylinder portions and having unidirectional flow-permitting means permitting flow of hydraulic liquid therepast only from the reservoir portion toward the outlets of the first pair of cylinder portions, a first pair of rack portions secured to the first pair of pistons in opposed positions extending toward the reservoir portion, an actuating shaft journaled in the casing, a pinion rotatable by the actuating shaft and meshing with both of the rack portions for moving the rack portions in opposite directions, a replenisher carried by the casing operable when actuated to tend to supply hydraulic liquid under a low pressure into the reservoir, means driven by the shaft for actuating the replenisher, a second pair of pistons slidable in the second pair of cylinder portions and having unidirectional flow permitting means permitting flow of hydraulic liquid therepast only from the reservoir portion toward the outlets of the second pair of cylinder portions, a second pair of rack portions secured to the second pair of piston in opposed positions extending toward the reservoir portion, an actuating sleeve rotatable on the actuating shaft, and a second pinion rotatable with the sleeve and meshing with the second pair of rack portions for moving the second pair of rack portions in opposite directions.

8. In a master control unit, a casing having a pair of cylinder portions of different cross sectional areas and having outlet passages at one end of each cylinder adapted to be connected to a reversible hydraulic device to be driven, the other ends of the cylinder portions communicating with the interior of the casing, a hydraulic liquid in the casing, a pair of pistons fitting closely in and slidable in the cylinder portions and each being provided with means permitting flow of the liquid therepast toward said one end of the cylinder portion and preventing flow of the liquid past the piston in the opposite direction, means coupling the pistons together to cause the pistons always to move in opposite directions relative to their respective cylinder portions, drive means for driving the pistons through the coupling means, and expansible and contractible means communicating with the interior of the casing for compensating for changes in volume in the casing as the pistons are moved therein.

9. The master control unit of claim 8 including a replenishing cylinder device including a replenisher piston operable by the drive means, and the expansible and contractible means including a check valve piston device floating with the replenisher piston.

References Cited
UNITED STATES PATENTS

| | | | |
|---|---|---|---|
| 1,617,275 | 2/1927 | Sarff | 60—54.6 X |
| 1,954,534 | 4/1934 | Norton | 60—54.5 X |
| 2,197,126 | 4/1940 | Dick | 60—54.5 X |
| 2,315,270 | 3/1943 | Palmer | 60—54.5 |
| 3,395,811 | 3/1946 | Griffith | 60—54.5 |
| 2,437,821 | 3/1948 | Hughes | 60—54.5 |
| 2,585,389 | 2/1952 | Kehrl | 60—54.5 |
| 2,615,305 | 10/1952 | Jannsen | 60—54.5 X |
| 2,657,535 | 11/1953 | Levy | 60—54.5 |
| 2,854,821 | 10/1958 | Nallinger | 60—54.6 |
| 3,146,597 | 9/1964 | Knauss | 60—54.6 |

FOREIGN PATENTS 411,193  6/1934  Great Britain.

MARTIN P. SCHWADRON, Primary Examiner.

R. R. BUNEVICH, Assistant Examiner.

U.S. Cl X.R.

60—54.6; 317—235

UNITED STATES PATENT OFFICE
CERTIFICATE OF CORRECTION

Patent No. 3,433,018　　　　　　　　　　　　　　　　　　March 18, 1969

Elmer E. Goehler

It is certified that error appears in the above identified patent and that said Letters Patent are hereby corrected as shown below:

Column 3, line 5, "shalt" should read -- shaft --; line 71, "replisher" should read -- replenisher --. Column 4, line 23, "replenished" should read -- replenisher --. Column 6, line 57, after "expansible" insert -- by --. Column 10, line 16, "3,395,811" should read -- 2,395,811 --.

Signed and sealed this 31st day of March 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents